June 10, 1958     E. G. STAUDE     2,838,125
STEERING WHEEL STABILIZER
Filed Sept. 23, 1957
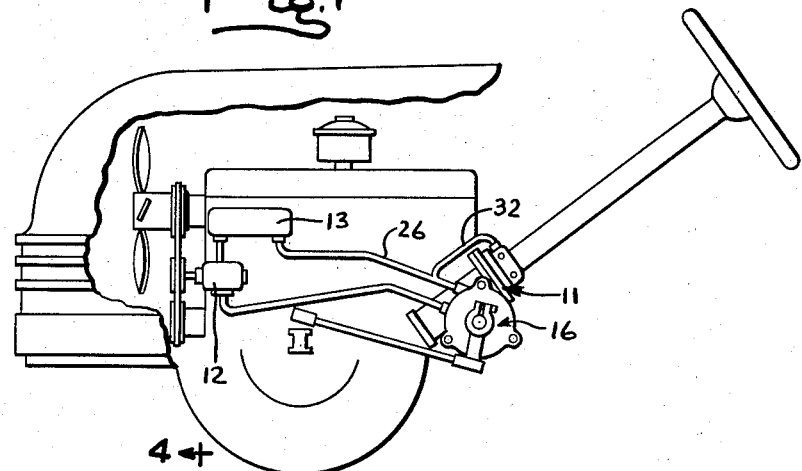
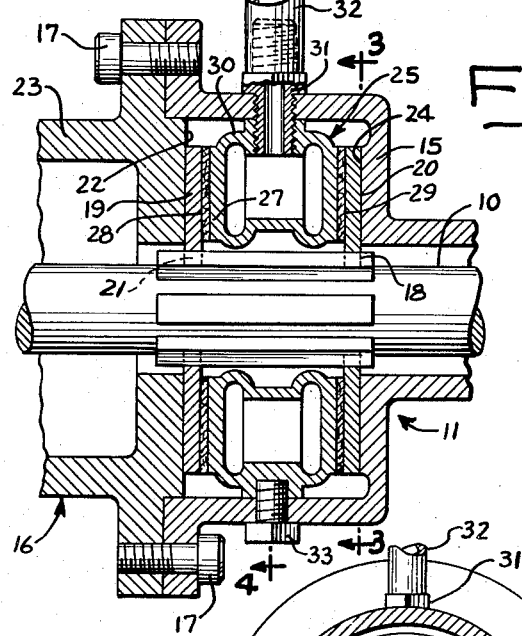
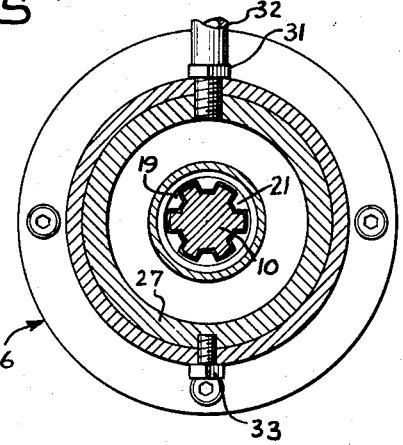
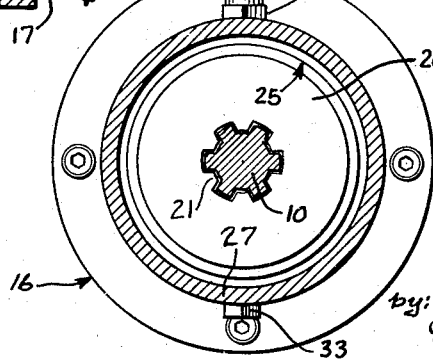
INVENTOR
EDWIN G. STAUDE
by: Carlson, Pitzner,
Hubbard & Wolfe ATTYS.

United States Patent Office 2,838,125
Patented June 10, 1958

2,838,125

STEERING WHEEL STABILIZER

Edwin G. Staude, Los Angeles, Calif., assignor of one-half to Olive B. Staude

Application September 23, 1957, Serial No. 685,483

1 Claim. (Cl. 180—79.2)

This invention is an improvement over my Patent No. 2,798,567, issued July 9, 1957, which has to do with stabilizing the steering wheel of motor cars at high speeds.

In my Patent No. 2,798,567, the stabilizer brake is electrically operated. It is the main object of my present invention to provide a pressure fluid operated brake and a method of operating the same so that the braking force applied to the steering wheel varies with the speed of the car so that the stabilizing effect is produced primarily at high speeds. In the type of power steering system in which the stabilizer of the present invention is preferably incorporated, a variable delivery pump is used, the output of which varies with the variations in speed of the car motor. To accomplish the above object I utilize the variable pressure in the return oil flow circuit from the power steering unit to the pump through the return flow tube. This pressure, of course, depends on the size of the tube, the manner of connection to the tube and also this connection should be as far from the reservoir as possible. Experience has proven that when the vehicle engine is idling at about 400 R. P. M., a minimum pressure of ¼ p. s. i. is present in the return flow tube. This pressure increases progressively and reaches a value with the car traveling at 60 miles per hour, where the pressure in the oil return tube is 3 p. s. i. with a typical system, although other pressures may be obtained, as will be evident to a man skilled in the art.

It is well known that at high speeds of 60 miles per hour or faster, the steering wheel becomes over-sensitive and almost appears to be loose on the steering shaft, especially on so-called "full time" power steering and therefore requires a firm hold on the steering wheel in order not to lose control of the vehicle.

Many drivers drive at high speed with one hand on the steering wheel and with the other hand reach for a cigarette or lighter, or too often talk with one hand.

The aforementioned patent discloses a stabilizer for interposing a resistance to turning the steering shaft. Without my stabilizer the steering wheel has to be restrained to keep control, but with my stabilizer at high speeds the steering is accomplished by moving the steering wheel manually. At high speeds the stabilizer holds the steering wheel from roaming even with both hands removed from the steering wheel, since the braking force produced is applied to the steering shaft to prevent it from turning freely.

There is the further fact that at high speeds the front ground wheels tend to rise from the ground due to the wind and the mechanical traction result at high engine torque.

This condition is a further reason for a loose steering wheel which can only be corrected by progressively loading the steering shaft when driving at high speeds.

Since there is no need to stabilize the steering wheel at normal city driving (speeds of from 20 to 30 miles per hour) it is therefore intended that with my invention nothing should interfere with power steering driving until after a predetermined speed in this range is attained.

My invention may be applied to any form of power steering and for the purpose of illustration, I have shown it attached to a vane-type of power steering shown and described in my Patent No. 2,579,711.

With my stabilized steering wheel a driver will be greatly assisted in safer driving because he must move the steering wheel to steer manually and not restrain the steering wheel continuously from its natural weaving characteristic, as is the case without my stabilizer.

With the stabilizer the driver must exert a pull on the steering wheel rim of from 6 to 7 pounds at high speeds and this also restores the much desired ground feel at high speed because at high speeds the steering wheel will not turn of itself unless moved manually to overcome the resisting feel on the rim of the steering wheel due to my stabilizer which progressively loads the steering wheel shaft.

Other objects and advantages will become apparent as the following description proceeds, taken in connection with the accompanying drawings, in which:

Figure 1 is a diagrammatic view of my invention attached to a vane type of power steering system for purposes of illustration;

Fig. 2 is a vertical sectional view of my invention showing the pressure fluid operated stabilizer;

Fig. 3 is a sectional view taken in the plane of lines 3—3 of Fig. 2; and

Fig. 4 is a sectional view taken in the plane of lines 4—4 of Fig. 2.

While the invention is susceptible of various modifications and alternative constructions, a certain illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claim.

Referring to the drawings, the system for interposing resistance to turning the steering shaft 10 is shown in Figure 1 as comprising a pressure fluid operated stabilizer 11 mounted on the steering column, a pump 12 driven by the vehicle engine, and a reservoir 13 connected to the pump and to the stabilizer 11.

As shown more particularly in Fig. 2, the stabilizer is mounted in a housing 15 which is bolted to the housing of the power steering unit 16 by means such as bolts 17 so as to be in surrounding relation with the steering shaft 10. The steering shaft 10 has a splined portion 18 which extends through the housing 15 and is provided for slidably supporting a pair of brake discs 19, 20. To mount the brake discs 19, 20 for rotation by the steering shaft 10, the brake discs are provided with teeth 21 to fit the splines on the steering shaft.

The brake discs 19, 20, in accordance with the present invention, are mounted for rubbing engagement with flat annular frictional surfaces 22, 24, presented by the end walls of the structure housing the stabilizer 11, including the housing 23 for the power steering unit 16 and the housing 15 for the stabilizer.

In accordance with the present invention, between the brake discs 19, 20 there is provided a pressure fluid operated actuator 25 which is connected in the return line 26 extending between the reservoir 13 and the power steering unit 16 to receive oil under pressure. In the present instance, the pressure fluid operated actuator 25 is in the form of an annular expandable receptacle 27 of material impervious to fluid. It is preferred that the material used be resilient yet sufficiently stiff so that the annular receptacle defines a self-supporting expandable chamber. It is preferred that the annular receptacle have facings 28, 29 coextensive with the inner faces of the brake discs 19, 20 of wear resistant material and bonded to the outer wall of the receptacle, so that the wear due to friction does not damage the receptacle even over extended periods of use.

For connecting the pressure fluid operated actuator 25 to the return line 26, in the present instance the peripheral wall 30 of the annular receptacle 27 is formed to mount the nipple 31 or another fitting appropriate for the purpose, for connecting the interior of the annular receptacle to a transfer line 32 which is T'd into the return line 26. For more securely anchoring the annular receptacle 27 in place within the stabilizer housing, at a point 180° from the connection to the nipple 31, a cap screw 33 may be used for fastening the receptacle to the housing wall.

In the operation of the pressure fluid operated stabilizer, upon starting of the car engine, the oil pump 12 circulates fluid to the power steering unit 16, and through the return line 26 and transfer line 32, to the annular receptacle 27 of the stabilizer. This oil pressure at low speeds produces relatively little axial expansion of the receptacle and consequently a relatively insignificant force is applied to the brake discs urging them axially into abutting and braking engagement with the respective frictional surfaces provided by the housing walls. Thus, circulating pressures at low vehicle speeds are insufficient to interpose a sufficient braking force to provide "feel" on the steering wheel.

As the engine and vehicle speeds rise to a point somewhere between 20 and 30 miles per hour, the increased oil volume and therefore increased circulation pressure expands the receptacle axially producing a circular braking force upon engagement of the same with the brake discs 19, 20, and a further braking force when the brake discs 19, 20 are urged in rubbing engagement with the respective frictional surfaces provided by the housing walls. It is preferred that the proportions be such that a reaction is felt of about 1 pound pull on the rim of the steering wheel at such speeds.

As an illustration of the proportions which might be used in a typical stabilizer, the brake discs 19, 20 are made approximately 5 inches in diameter. This presents approximately 25 square inches of surface on the two brake discs, which at pressures ranging up to 3 p. s. i. provides up to approximately 75 pounds for braking purposes. It is contemplated that the annular receptacle is to be located, as shown in Fig. 2, between the brake discs and is to have sufficient internal rigidity to hold the brake discs separated and touching the frictional surfaces on the end walls of the structure housing the stabilizer. The touching engagement, however, is without any substantial pressure and therefore causes little if any braking force to be applied to the steering shaft. It is further contemplated that there is to be only a minute actual movement of the receptacle and the brakes discs, the braking effect interposed upon the steering shaft being the result of circular forces developed due to increased pressure between the facings 28, 29 on the receptacle and the brake discs 19, 20; and the brake discs and the respective frictional surfaces due to rubbing engagement therebetween.

As the speed of the vehicle increases above a speed of between 20 to 30 miles per hour, with a system constructed in the manner contemplated, for each increase in speed of 5 miles per hour, the circulating pressure in the return line 26 will increase proportionately to produce an increase of 1 pound pull on the rim of the steering wheel. Thus, the braking force applied to the steering shaft felt in pull on the steering wheel is insignificant up to between 20 and 30 miles per hour, at which point it is contemplated that the pull will be measurable at approximately 1 pound. 2 pounds pull will be felt at 40 miles per hour, 3 pounds pull at 45 miles per hour, etc. Such forces are sufficient to hold the steering wheel from self motion, or roaming, and thus the vehicle from weaving. Consequently, the steering wheel is stabilized so that in order to steer the vehicle the wheel must be moved manually by the application of an appreciable force.

While it is to be understood that when the invention is operating in the preferred manner there is a loading of the steering wheel shaft to require a pull on the rim of the steering wheel, for example of from 6 to 7 pounds at highway speeds of 60 miles per hour, the system is so constituted that by varying the size of the brake disc members, the conduit diameters, etc., the force produced may be raised or lowered dependent upon the design considerations imposed. In its preferred form, the braking force interposed in the power steering system varies in accordance with vehicle speeds, being applied initially at a predetermined vehicle speed. The value of the said predetermined and relatively low vehicle speed is preferably about 30 miles per hour when the circulating pressure in a system as illustrated herein, attains a value such that the force produced by the pressure fluid operated actuator 25 results in a measurable and effective force due to the engagement of the brake members, resisting turning movement of the steering shaft.

I claim as my invention:

In a steering wheel stabilizer for use in a vehicle power steering system having a steering shaft which steers the vehicle through the agency of the road wheels when turned manually, and a power unit connected to said steering shaft and operated by a pump driven by the vehicle engine, the combination comprising, a stabilizer housing mounted in surrounding relation with said steering shaft, spaced brake disc members mounted coaxially of said steering shaft in said housing, said shaft having a splined portion and said brake discs being formed to fit about said splined portion for rotation with said steering shaft, said housing having end walls defining frictional surfaces facing the respective outer sides of the spaced brake disc members, a fluid pressure actuator mounted in said housing between said brake disc members and including an annular receptacle having outer faces of wear resistant material coextensive with said brake discs, said receptacle being mounted to be expandable axially in both directions upon the application of pressure fluid and having sufficient internal rigidity in the absence of pressure fluid to engage said facings with said brake disc members and further to urge the members into rubbing engagement with the said frictional surfaces in said housing, the engagement of said facings with the disc members upon the application of pressure fluid to the receptacle producing a circular braking force and rubbing engagement of said disc members with the frictional surfaces producing a further circular braking force, both said circular braking forces being applied to the steering shaft by means of the disc members, said receptacle having a pressure fluid connection to said pump so that said actuator is operated by pressure fluid derived from said power steering system.

References Cited in the file of this patent

UNITED STATES PATENTS

| | | |
|---|---|---|
| 1,640,545 | Heaton | Aug. 30, 1927 |
| 1,921,951 | Simon et al. | Aug. 8, 1933 |
| 2,191,125 | Collins | Feb. 20, 1940 |
| 2,798,567 | Staude | July 9, 1957 |